United States Patent [19]

Steinbrecher

[11] Patent Number: 5,582,934
[45] Date of Patent: Dec. 10, 1996

[54] ADDITIVES FOR ELECTROLYTIC SOLUTIONS

[75] Inventor: Lester Steinbrecher, North Wales, Pa.

[73] Assignee: Henkel Corporation, Plymouth Meeting, Pa.

[21] Appl. No.: 442,971

[22] Filed: May 17, 1995

[51] Int. Cl.$^6$ .................................................. H02M 6/04
[52] U.S. Cl. .................................. 429/204; 429/198
[58] Field of Search .................................. 429/198, 204

[56] References Cited

U.S. PATENT DOCUMENTS 3,281,281  10/1963  Schaefer ........................... 136/107
3,945,849   3/1976  Hoffman ............................ 429/201
4,617,244  10/1986  Greene ............................. 429/203

*Primary Examiner*—Stephen Kalafut
*Assistant Examiner*—Richard H. Lilley, Jr.
*Attorney, Agent, or Firm*—Ernest G. Szoke; Wayne C. Jaeschke; Wayne C. Jaeschke, Jr.

[57] ABSTRACT

The present invention relates to compositions and methods for improving the performance of lead-acid storage batteries, and reducing corrosion in lead-acid storage batteries, including the plates, terminals, posts, and cables. Compositions of the invention include cathodic inhibitors and solutions of cathodic inhibitors.

13 Claims, No Drawings

ADDITIVES FOR ELECTROLYTIC SOLUTIONS

BACKGROUND OF THE INVENTION

1. Field of the Invention

This invention relates primarily to additives for the electrolyte solutions used in lead-acid storage batteries. The additives of the present invention enhance battery performance and reduce corrosion.

2. Prior Art

Lead-acid storage batteries have been used for many years for many purposes. It is well known that most automobile batteries are of the lead-acid variety; and many other types of vehicles rely on lead-acid batteries as a source of power to start their internal combustion engines. Such vehicles include airplanes, ships, submarines, and most construction equipment.

Further, lead-acid batteries are used as sources of power where there is no access to conventional sources of electricity, and the use of a generator is not feasible. Even in instances where a generator is employed, the generator is likely to use a lead-acid storage battery as its source of ignition.

Surprisingly, over the years there have been few, if any, substantive advancements in lead-acid storage battery technology. Most advancements in battery technology have related to the advent of new types of batteries; such as those based on metal-anhydrides, zinc, or other components commonly known as alkaline batteries. Advancements in lead-acid batteries have been limited to improvements in the battery casings or in corrosion reducing seals where the lead posts emerge from the casing. Few attempts have been made to improve the performance of a lead-acid storage battery by enhancement or modification of the electrolyte solution.

In Greene U.S. Pat. No. 4,617,244, it was suggested that the use of mixtures of metal salts or chelants of iron and magnesium could effectively increase the flow of current through the electrolyte solution to improve battery performance. However, the mechanism by which the addition of chelants and metal salts could enhance battery performance is unclear; and it is likely that the use of such additives would cause contamination of the lead plates and premature loss of battery activity.

The present invention avoids the potential problems presented by the use of metal salts and chelants by employing an electrolyte solution which works without entering strong ionic components into the electrolyte, thus reducing the possibility of short-lived enhancements to the battery or premature loss of battery activity.

SUMMARY OF THE INVENTION

In general, the invention features, in one of its aspects, an electrolyte solution for use in a lead-acid storage battery. The electrolyte comprises a solution of sulfuric acid in water at a concentration of about 10% to about 50%, by volume of sulfuric acid. Added to the sulfuric acid solution, according to the invention, is a quantity of a cathodic inhibitor or cathodic inhibitor solution. Exemplary of cathodic inhibitors suitable for use in the present invention are triazines, thiourea, dibutyl thiourea, di-ethyl thiourea, propargyl alcohol, 1-hexyne 3-ol, hexamethylene tetramine, alkyl pyridines, keto amines, and tri-phenyl sulfonium chloride. The triazines are preferred, particularly 1,3,5-orthotolyl 1,3,5-triazine.

The concentration of the cathodic inhibitor in the electrolyte solution will vary depending on the anticipated operating conditions of the battery. Anticipated operating conditions may include, but are not limited to, ambient pressure, operating temperature, sulfuric acid concentration, battery voltage and current needs, and the particular cathodic inhibitor, or mixtures of cathodic inhibitors, selected for use. The concentration of the cathodic inhibitor in the electrolyte solution is from about 0.01% to about 10.0%, by volume. Cathodic inhibitor solutions of the present invention may comprise a mixture of the aforementioned cathodic inhibitors or mixtures of cathodic inhibitors with surfactants or other ingredients.

In one preferred embodiment of the present invention, the cathodic inhibitor solution may comprise a mixture of any of the previously mentioned inhibitors admixed with a surfactant, acid, distilled, deionized, or tap water, mixtures of alkyl pyridines, alkyl aryl polyalkyleneamine salts, octylphenoxy polyethoxy ethanol, triphenyl sulfonium chloride, or mixtures thereof.

Typically, the surfactant will be of the type commonly known as alkylaryl polyether alcohols (which are non-ionic surfactants), which are prepared by reacting octylphenols with ethylene oxide. In a particularly preferred embodiment, the alkylaryl polyether alcohol will have a degree of ethoxylation of 12–13; meaning that there will be, on average, 12–13 ethylene oxide units in each ether chain. Preferred surfactants of this type include octylphenoxy polyethoxy ethanol and nonylphenoxy polyethoxy ethanol.

Suitable acids for preparation of a cathodic inhibitor solution may include sulfuric, hydrochloric, citric, phosphoric, and organic acids such as EDTA.

In a preferred embodiment of the invention, the components of the cathodic inhibitor solution comprise 1,3-diethyl thiourea as the cathodic inhibitor, 66° Be sulfuric acid, a mixture of alkyl pyridines, an alkylaryl polyether alcohol having 12–13 ethylene oxide units in each ether chain, and deionized water.

Another aspect of the invention relates to a method for enhancing the performance characteristics of a lead-acid storage battery, including decreasing the corrosion that occurs in the battery and at the battery posts, cables and terminals. This method includes providing an appropriate receptacle to be the battery housing. The housing is then fitted with lead plates to act as anodes and lead oxide plates to act as cathodes.

The battery housing is filled with a sulfuric acid solution, generally at a concentration within the range of about 10.0% to about 50.0% of sulfuric acid in water. A lower concentration of the acid may be used when the battery is required to deliver a very low voltage.

The cathodic inhibitor solution is then admixed with the sulfuric acid solution. Depending on the expected usage and operating conditions of the battery, the concentration of the cathodic inhibitor solution in the sulfuric acid solution will vary from about 0.01% to about 20.0%, by total volume of the electrolyte solution. Although higher concentrations of the cathodic inhibitor solution may be employed, it is uncertain whether there will be any significant performance advantage that will offset the cost of additional chemical usage.

In another preferred embodiment of the method of the present invention, a solution of sulfuric acid in water which is from about 20.0% to about 35.0%, of sulfuric acid, is added to the battery housing. The cathodic inhibitor is added to the sulfuric acid solution until the concentration of inhibitor in the sulfuric acid solution reaches about 0.05% to about 15.0%, by total volume of the electrolyte solution. Further, the cathodic inhibitor solution per se comprises from about 10.0% to about 70.0% of 1,3,5-orthotolyl 1,3, 5-triazine.

In another preferred embodiment of the method of the present invention, the concentration of the solution of sulfuric acid in water, that is added to the battery housing, is from about 20.0% to about 35.0%, by weight of sulfuric acid in water; and the cathodic inhibitor is added to the sulfuric acid solution until the concentration of inhibitor reaches from about 1.0% to about 6.0%, by volume of the total electrolyte solution. Further, the cathodic inhibitor comprises from about 5.0% to about 20.0% of the active ingredient 1,3-diethyl thiourea, by weight of the cathodic inhibitor solution, 66° Be sulfuric acid, at least one alkyl pyridine but preferably a mixture of alkyl pyridines, octylphenoxy polyethoxy ethanol, and deionized water.

In order to provide the benefits of the present invention stated herein, a corrosion inhibiting amount of cathodic inhibitor must be present in the battery. Accordingly, it is preferred to use a corrosion inhibiting amount of a cathodic inhibitor solutions, a corrosion inhibiting amount comprises from about 5% to about 75% of at least one triazine, from about 5% to about 75% of a thiourea, from about 5% to about 75% of a di-butyl thiourea, from about 5% to about 75% of a di-ethyl thiourea, from about 5% to about 75% of a propargyl alcohol, from about 5% to about 75% of a 1-hexyne 3-ol, from about 5% to about 75% of a hexamethylene tetramine, from about 5% to about 75% of an alkyl pyridine, from about 5% to about 75% of a keto amine, or from about 5% to about 75% of a tri-phenyl sulfonium chloride. Any of these solutions, or mixtures thereof, may be added to the electrolyte solution of a lead-acid storage battery to achieve the desired results. In achieving the expected results of the present invention, it is preferred that the concentration of the cathodic inhibitor solution in the electrolyte solution be from about 0.1% to about 20.0% by volume of cathodic inhibitor solution as a percentage of the the volume of the total electrolyte solution.

Since the advantages of the present invention can be employed with any lead-acid battery, it should be noted that the concentration of sulfuric acid in the electrolyte solution can be from as low as about 5.0% to as high as about 50.0%. The preferred concentration of sulfuric acid in water is from about 20.0% to about 40.0%, by weight of sulfuric acid as a percentage of the total weight of the electrolyte solution.

Accordingly, the present invention provides a new and improved electrolyte solution for increasing the performance, life, safety, reliability, and efficiency of lead-acid storage batteries.

Further, the invention provides an electrolyte solution which will yield greater battery performance under conditions of extreme temperature variation and will increase the ability of the battery to operate without significant loss of performance after long periods of inactivity.

Moreover, the invention provides an electrolyte solution which will reduce the gassing which normally occurs in lead-acid storage batteries, and thereby reduce the possibility of explosion, and reduce corrosion of the lead plates, lead posts, battery terminals, and cables attached thereto. These and other objects of the present invention will be apparent from the following detailed description of the invention.

DETAILED DESCRIPTION OF THE INVENTION

Cathodic inhibitors are organic molecules which, it is theorized, adsorb onto cathodic areas of a metal surface and inhibit the discharge of hydrogen atoms from the cathodic areas. Furthermore, a correlation exists between the possible area an inhibitor might cover and its inhibition strength. Accordingly, in a homologous series, e.g., R-NH$_2$, inhibition increases as R increases in molecular weight, where R is an alkyl group with 2 to thirty carbon atoms. Of these, the higher alkyls, however, are preferred.

Stated another way, by virtue or the molecular geometry of the inhibitor molecule, the inhibitor is seemingly able to decrease the ability of an acid to attack the cathodic sites and, thereby, reduces the liberation of hydrogen gas which is known as gassing. Within a lead-acid storage battery, gassing is a problem which can cause injuries and explosions. Gassing requires that the battery vent vapors into its surrounding environment. Also, gassing will quickly corrode the battery posts and cables, as evidenced by the lead oxide or lead sulfate residue on most batteries found in automobiles. When severe gassing occurs, it may be impossible to vent the gasses quickly enough and an explosion can occur. Because of the concentrated acid and lead plates within lead-acid batteries, an explosion of this nature is very dangerous.

The preparation and compositions of cathodic inhibitor solutions, as well as methods of the present invention of enhancing lead-acid storage battery performance, are illustrated by way of the following examples. In these examples, and elsewhere in the specification, all parts and percentages are by weight unless expressly stated otherwise; and all temperatures are degrees Celsius unless stated otherwise. Further, all weights, temperatures, percentages, and other units of measure are understood to be modified by the term "about", unless expressly stated otherwise.

EXAMPLE 1

Production of Corrosion Inhibitor Solution

One gallon of a cathodic inhibitor solution is prepared by adding 1.241 lbs. of 66° Be sulfuric acid to 2.623 lbs. deionized water in a kettle and allowing it to cool to room temperature. 3.962 lbs. of a mixture of alkyl pyridines (sold under the tradename Alkolodine 12 by Lonza Chemical Corp., Fairlawn, N.J.) is slowly added while stirring and cooling the mix to 150° F. Stirring is then continued while adding 1.227 lbs. of 1,3-diethyl thiourea and 0.472 lbs. of octylphenoxy polyethoxy ethanol. The solution is stirred continuously at 140° F. until it is homogeneous.

EXAMPLE 2

Use of Corrosion Inhibitor Solution in a Lead-Acid Storage Battery

A method of enhancing the performance of a lead-acid storage battery is illustrated by the following:

A new 12 volt six-cell lead-acid storage battery is obtained without an electrolyte. A standard 35% sulfuric acid solution is added to the battery, leaving room at the top for the addition of the cathodic inhibitor solution. For each liter (1000 ml) of the 35% sulfuric acid solution added to the battery, 0.05 liters (50 ml) of the cathodic inhibitor solution prepared in Example 1 is also added to the battery.

The resulting enhanced battery contains an electrolyte solution with a 4.8% concentration of cathodic inhibitor solution, by volume, as a percentage of the total volume of the electrolyte solution. Further, this battery can be expected to exhibit performance improvements including reduced gassing; increased life; reduced corrosion at the posts, terminals, and cables; a reduction in the time required to fully charge the battery; and the ability to remain idle for a longer period of time, under a variety of temperature conditions, while retaining a greater amount of charge in comparison to a battery containing no cathodic inhibitor solution in its electrolyte solution.

EXAMPLE 3

Production and use of cathodic inhibitor solutions using 1,3,5-orthotolyl 1,3,5-triazine as the cathodic inhibitor One gallon of a base solution for a cathodic inhibitor solution of the present invention is prepared by adding 3.104 lbs. of a 37% solution of formaldehyde to 3.197 lbs of orthotoluidine while stirring at a temperature of at least 60° F. This solution is stirred constantly for at least one hour. This solution will react to produce a considerable amount of heat.

0.60 lbs. of a 20° Be solution of hydrochloric acid solution is added to the solution very slowly. Once the ensuing violent reaction has subsided, an additional 2.411 lbs. of the 20° Be hydrochloric acid solution is added somewhat more rapidly. The reaction that occurs when the base solution is prepared yields 1,3,5-orthotolyl 1,3,5-triazine, which is the preferred inhibitor for producing many cathodic inhibitor solutions, as is illustrated in the remainder of this example.

Solution A is prepared by taking 3.906 lbs. of the base solution (comprising 1,3,5-orthotolyl 1,3,5-triazine), adding 0.316 lbs of 1,3-diethyl thiourea, and warming the resulting solution to at least 50°–60° F. Then, 0.46 lbs. of octylphenoxy polyethoxy ethanol surfactant is added and the solution is mixed for 15–20 minutes. Then, 4.236 lbs. of tap water is added and the solution is mixed continuously until the solution is homogeneous.

Solution B is prepared by taking 3.911 lbs. of the base solution (comprising 1,3,5-orthotolyl 1,3,5-triazine), adding 0.236 lbs of 1,3-diethyl thiourea and warming the resulting solution to at least 50°–60° F. Then, 0.938 lbs. of octylphenoxy polyethoxy ethanol surfactant is added and the solution is mixed for 15–20 minutes. Then, 3.505 lbs. of tap water is added and the solution is mixed continuously until the solution is homogeneous.

Either solution A or Solution B may be added to a lead-acid storage battery by introducing a sufficient amount of the cathodic inhibitor solution to the electrolyte solution already in a battery to make the total concentration of the cathodic inhibitor solution in the electrolyte between about 0.1% and about 10%, by volume of the cathodic inhibitor solution as a percentage of the total volume of the electrolyte solution.

EXAMPLE 4

Preparation of a Cathodic Inhibitor Solution Which Employs Hexamethylene Tetramine One gallon of another cathodic inhibitor solution is prepared by mixing the following until homogeneous:

0.535 lbs. alkyl aryl polyalkyleneamine salt 1.274 lbs. 99% sol'n of isopropanol 0.551 lbs. glacial acetic acid (to be added slowly)

0.443 lbs. propargyl alcohol 1.253 lbs. hexamethylene tetramine 4.512 lbs. water The resulting mixture is then added to the electrolyte of a lead-acid storage battery by mixing 50 ml of the mixture with each 1000 ml of the electrolyte solution already in the battery.

EXAMPLE 5

Production of a Cathodic Inhibitor Solution Which Employs Triphenyl Sulfonium Chloride One gallon of a keto-amine base solution for another cathodic inhibitor solution is prepared by placing 2.340 lbs. of industrial dehydroabietylamine (where the carboxylic acid group has been modified to $CH_2NH_2$) in a reflux condenser and adding 0.780 lbs. of acetophenone. Next, 0.999 lbs. of 20° Be muriatic acid is added and the mixture is stirred until all the ingredients are completely in solution. Then, 0.969 lbs. of a 37% formaldehyde solution are added over a period of two hours. The mixture is then stirred and heated to 80° C. (liquid temperature) and maintained at that temperature, with stirring, for 24 hours.

Next, the mixture is cooled to 50° C. and 2.500 lbs. of acetone are added. The mixture is then stirred until all ingredients are completely in solution. Then, 0.954 lbs. of formaldehyde are added over a one hour period. The mixture is then refluxed for 24 hours at a temperature of 60° C. (liquid temperature). Excess acetone is then distilled and removed.

The mixture is then cooled to 50° C. and 1.407 lbs. of sodium alkyl sulfate surfactant are added along with 0.190 lbs. of tap water. After the mixture has been stirred and cooled to 40° C., 0.766 lbs. of isopropanol is added and stirring is continued for one hour.

Once the base solution is complete, one gallon of another cathodic inhibitor solution is prepared by taking 4.835 lbs. of the base solution and mixing with the following ingredients, while stirring:

2.437 lbs. of nonylphenoxy polyethylene oxyethanol surfactant 0.111 lbs. of tap water 0.831 lbs. of isopropanol 0.205 lbs. of propargyl alcohol 0.205 lbs. of triphenyl sulfonium chloride Note that the nonylphenoxy polyethylene oxyethanol surfactant should be warmed and added to the mixture as a liquid.

Once the mixture has been prepared, it can be added to the electrolyte solution of a lead-acid storage battery at the rate of 50 ml for each 1000 ml of electrolyte solution.

CONCLUSION

Lead-acid storage batteries having an electrolyte solution in accordance with the present invention will exhibit improved properties such as greater stability, allowing the battery to remain idle for long periods of time without losing its charge; improved battery life; reduced production of $H_2$ gas, which will reduce the acid attack on the battery poles and greatly decrease the chances that a storage battery will explode; and reduced corrosion appearing at the battery poles, allowing the battery manufacturer to use less costly measures to manufacture battery casings and seals. The advantages described above can be expected to be attained.

I claim as my invention:

1. An electrolyte solution for use in a lead-acid storage battery which comprises sulfuric acid, water, and a cathodic inhibitor solution, wherein said cathodic inhibitor solution comprises a cathodic inhibitor selected from the group consisting of at least one triazine, diethylthiourea, propargyl alcohol, 1-hexyne 3-ol, hexa-methylene tetramine, keto amine, triphenyl sulphonium chloride, at least one alkyl pyridine, and mixtures thereof.

2. The electrolytic solution of claim 1 wherein the concentration of said cathodic inhibitor in said electrolyte solution is a corrosion inhibiting amount of said cathodic inhibitor in said electrolyte solution and the concentration of said sulfuric acid is from about 15.0% to about 45.0%, by volume, of said solution.

3. The electrolytic solution of claim 1 wherein the concentration of said cathodic inhibitor in said electrolyte solution is from about 0.05% to about 5.0% by volume of said electrolyte solution; the concentration of said sulfuric acid is from about 15.0% to about 45.0%, by volume, of said electrolyte solution; and the cathodic inhibitor solution comprises a corrosion inhibiting amount of at least one cathodic inhibitor.

4. The electrolyte solution of claim 1 wherein the concentration of said cathodic inhibitor solution is from about 0.1% to about 1.0%, by volume, of said electrolyte solution; the concentration of said sulfuric acid is from about 15.0% to about 45.0%, by volume, of said electrolyte solution.

5. The electrolyte solution of claim 4 wherein said cathodic inhibitor solution comprises from about 10.0% to about 15.0%, by weight, of 1,3-diethyl thiourea; from about 3.0% to about 6.0%, by weight, of octylphenoxy polyethoxy ethanol surfactant; from about 35.0% to about 45.0% of a mixture of alkyl pyridines; from about 10.0% to about 15.0%, by weight, of a sulfuric acid solution.

6. The electrolyte solution of claim 4 wherein said cathodic inhibitor solution comprises from about 1.0% to about 5.0% of 1,3-diethyl thiourea, by weight; from about 0.01% to about 15.0% of octylphenoxy polyethoxy ethanol surfactant; from about 40.% to about 50.0%, by weight, of at least one triazine.

7. A method of improving the performance of a lead-acid storage battery having an electrolytic solution of from about 10.0% to about 50.0%, by volume, of sulfuric acid in water, which comprises adding a corrosion inhibiting amount of a cathodic inhibitor solution to said electrolytic solution, wherein said cathodic inhibitor is selected from the group consisting of at least one triazine, diethyl-thiourea, di-butyl thiourea, propargyl alcohol, 1-hexyne 3-ol, hexa-methylene tetramine, keto amine, triphenyl sulphonium chloride, at least one alkyl pyridine, and mixtures thereof.

8. The method of claim 7 wherein said cathodic inhibitor solution comprises a cathodic inhibitor selected from the group consisting of at least one triazine, diethyl-thiourea, di-butyl thiourea, propargyl alcohol, 1-hexyne 3-ol, hexa-methylene tetramine, keto amine, triphenyl sulphonium chloride, alkyl pyridines, and mixtures thereof.

9. The method of claim 7 wherein said cathodic inhibitor solution comprises from about 10.0% to about 15.0%, by weight, of 1,3-diethyl thiourea; from about 3.0% to about 6.0%, by weight, of octylphenoxy polyethoxy ethanol surfactant; from about 35.0% to about 45.0% of a mixture of alykl pyridines; from about 10.0% to about 15.0%, by weight, of sulfuric acid solution.

10. The method of claim 7 wherein said cathodic inhibitor solution comprises from about 1.0% to about 5.0% of 1,3-diethyl thiourea, by weight; from about 0.01% to about 15.0% of an octylphenoxy polyethoxy ethanol surfactant; from about 40.% to about 50.0%, by weight, of 1,3,5orthotolyl 1,3,5-triazine; and the remainder comprising water.

11. A lead-acid storage battery comprising an electrolyte comprising a corrosion inhibiting amount of a corrosion inhibitor selected from the group consisting of at least one triazine, diethylthiourea, di-butyl thiourea, propargyl alcohol, 1-hexyne 3-ol, hexa-methylene tetramine, keto amine, triphenyl sulphonium chloride, at least one alkyl pyridine, and mixtures thereof.

12. The battery of claim 11 wherein said corrosion inhibitor is selected from the group consisting of 1,3,5-orthotolyl 1,3,5-triazine, 1,3-diethyl thiourea, a keto amine, and mixtures thereof.

13. The battery of claim 11 wherein said corrosion inhibitor comprises 1,3,5-orthotolyl 1,3,5-triazine.

* * * * *